US008712374B2

(12) United States Patent
Sharma et al.

(10) Patent No.: US 8,712,374 B2
(45) Date of Patent: Apr. 29, 2014

(54) METHOD AND APPARATUS FOR PROVIDING CHARGING STATUS INFORMATION TO SUBSCRIBER OF COMMUNICATION SERVICE

(75) Inventors: Ranjan Sharma, New Albany, OH (US); Paul E. Sulewski, New Providence, NJ (US)

(73) Assignee: Alcatel Lucent, Paris (FR)

( * ) Notice: Subject to any disclaimer, the term of this patent is extended or adjusted under 35 U.S.C. 154(b) by 44 days.

(21) Appl. No.: 13/301,097

(22) Filed: Nov. 21, 2011

(65) Prior Publication Data

US 2012/0129490 A1   May 24, 2012

Related U.S. Application Data

(60) Provisional application No. 61/416,870, filed on Nov. 24, 2010.

(51) Int. Cl.
*H04M 11/00* (2006.01)

(52) U.S. Cl.
USPC ............ 455/406; 455/405; 455/407; 455/408

(58) Field of Classification Search
USPC .................................. 455/405, 406, 407, 408
See application file for complete search history.

(56) References Cited

U.S. PATENT DOCUMENTS

2007/0173226 A1* 7/2007 Cai et al. ........................ 455/405
2011/0151831 A1* 6/2011 Pattabiraman ................ 455/405

OTHER PUBLICATIONS

LTE Evolved Packet System Architecture, Alcatel-Lucent, Product Brochure No. RMK7526091004 (10), 2009, 9 pages.
Alcatel-Lucent 8610 ICC, Instant Convergent Charging Suite, Alcatel-Lucent, Product Brochure No. ASG0599091107 (12), 2009, 3 pages.
Alcatel-Lucent 8615 IeCCF, Instant Enhanced Charging Collection Function, Alcatel-Lucent, Product Brochure No. CAR2888080840 (09), 2008, 4 pages.
Alcatel-Lucent Instant Enhanced Charging Collection Function, Release 29, Alcatel-Lucent, Product Brochure No. M201110976 (October), 2011, 2 pages.
RFC 4006, Diameter Credit-Control Application, Network Working Group, Standards Track, Hakala et al., Aug. 2005, 114 pages.
RFC 3588, Diameter Base Protocol, Network Working Group, Standards Track, Calhoun et al., Sep. 2003, 147 pages.
3GPP TS 32.299 V6.12.0, Telecommunication management— Charging management—Diameter charging applications (Release 6), 3GPP Organizational Partners, Sep. 2009, 110 pages.

* cited by examiner

*Primary Examiner* — Kathy Wang-Hurst
(74) *Attorney, Agent, or Firm* — Fay Sharpe, LLP

(57) ABSTRACT

A method for providing charging status information to a subscriber of a communication service includes: receiving an accounting request (ACR) from a network element (NE) at a charging collection function (CCF) subsystem, the ACR associated with communication service provided to a subscriber in conjunction with a communication session, the subscriber subject to a rate plan that applies different billing rates for different usage levels, the ACR including a volume parameter indicating usage since a previous ACR; converting the ACR to a credit control request (CCR), the CCR including a usage parameter indicating usage since a previous CCR; sending the CCR to a quota monitoring function (QMF) subsystem; adding the volume parameter to a previously consumed amount in relation to a billing cycle to form a total consumed amount; and comparing the total consumed amount to a threshold value associated with a quota value for a first usage level.

24 Claims, 11 Drawing Sheets

802 — RECEIVING AT LEAST ONE PREVIOUS ACR FROM THE COMMUNICATION NETWORK AT THE CCF SUBSYSTEM ASSOCIATED WITH THE COMMUNICATION SERVICE PROVIDED TO THE SUBSCRIBER BY THE SERVICE PROVIDER IN CONJUNCTION WITH THE COMMUNICATION SESSION, THE AT LEAST ONE PREVIOUS ACR INCLUDING THE INCREMENTAL VOLUME PARAMETER INDICATING USAGE OF THE COMMUNICATION SERVICE FOR THE COMMUNICATION SESSION SINCE A MOST RECENT PREVIOUS ACR

804 — FOR EACH AT LEAST ONE PREVIOUS ACR, DETERMINING THE CORRESPONDING AT LEAST ONE PREVIOUS ACR DOES NOT INCLUDE A VOLUME LIMIT PARAMETER INDICATING A PREDETERMINED INCREMENTAL VOLUME LIMIT WAS EXCEEDED IN CONJUNCTION WITH THE COMMUNICATION SESSION SINCE THE MOST RECENT PREVIOUS ACR

806 — FOR EACH AT LEAST ONE PREVIOUS ACR, ADDING THE USAGE FROM THE INCREMENTAL VOLUME PARAMETER OF THE CORRESPONDING AT LEAST ONE PREVIOUS ACR TO AN INCREMENTAL CONSUMED AMOUNT STORED IN A VOLUME LIMIT STORAGE DEVICE ACCESSIBLE TO THE CCF SUBSYSTEM

808 — DETERMINING THE CURRENT ACR INCLUDES THE VOLUME LIMIT PARAMETER AND INDICATES THE PREDETERMINED INCREMENTAL VOLUME LIMIT WAS EXCEEDED IN CONJUNCTION WITH THE COMMUNICATION SESSION SINCE THE MOST RECENT PREVIOUS ACR

810 — ADDING THE USAGE FROM THE INCREMENTAL VOLUME PARAMETER OF THE CURRENT ACR TO THE INCREMENTAL CONSUMED AMOUNT STORED IN THE VOLUME LIMIT STORAGE DEVICE TO FORM THE INCREMENTAL USAGE PARAMETER FOR THE CURRENT CCR

302

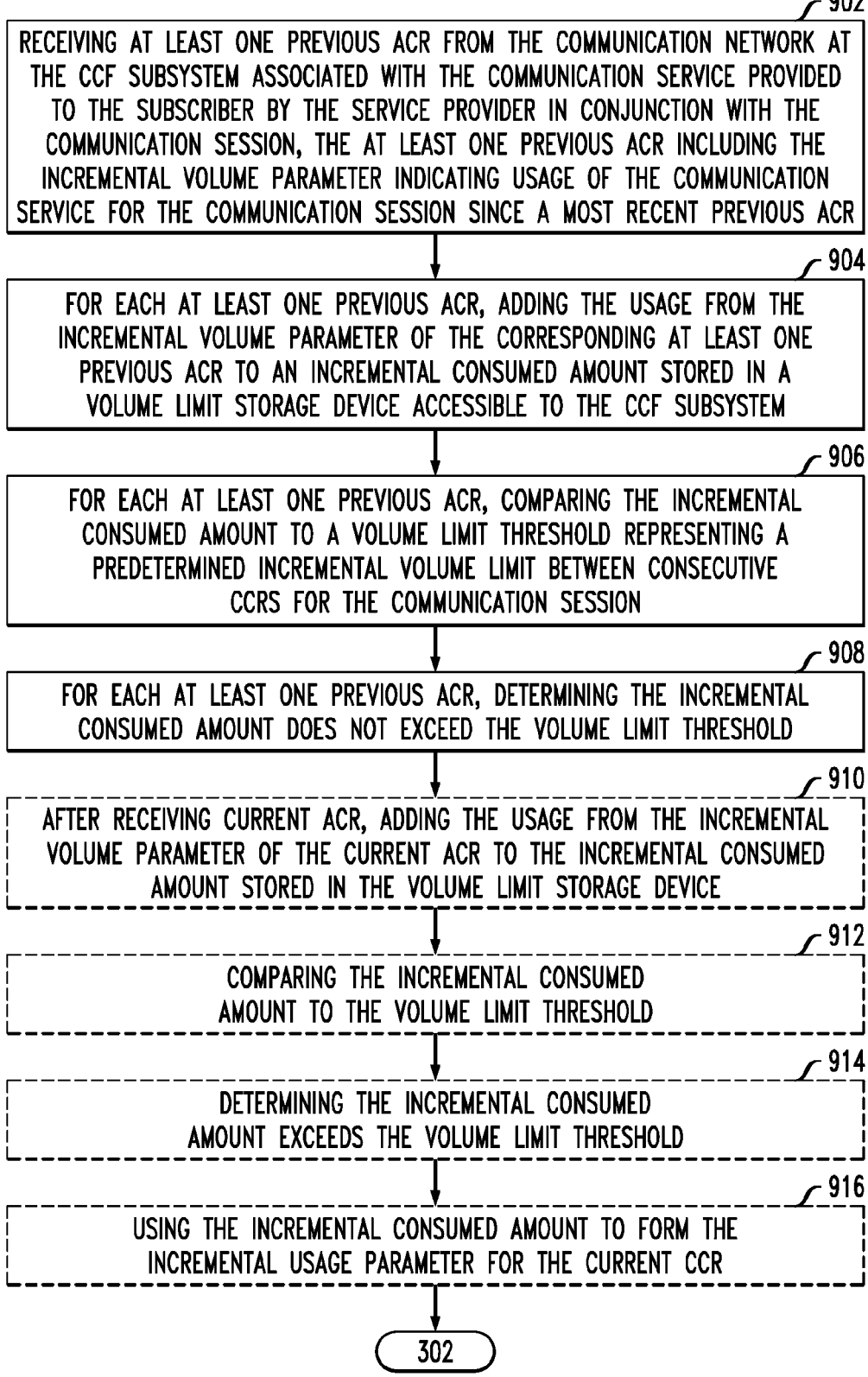

METHOD AND APPARATUS FOR PROVIDING CHARGING STATUS INFORMATION TO SUBSCRIBER OF COMMUNICATION SERVICE

CROSS REFERENCE TO RELATED PATENTS AND APPLICATIONS

This patent application claims priority to and any benefit associated with U.S. provisional patent application, Ser. No. 61/416,870, filed Nov. 24, 2010, the contents of which are fully incorporated herein by reference.

BACKGROUND

This disclosure relates to a charging system for processing accounting information for communication sessions so that a communication service provider can charge subscribers for communication services and also provide charging status information to the subscriber. Various embodiments of the charging system and method for providing charging status information are provided for a communication service in which charging trigger functions from the communication network provide accounting information for a communication session to an offline charging subsystem (OFCS). In these embodiments, the charging system uses an OFCS and an online charging subsystem (OCS) to process the accounting information from the charging trigger functions, determine a charging status for the subscriber, and periodically communicate charging status information to the subscriber. The methods described herein may also be used to provide subscribers with charging status information for other types of communication services, other techniques for collecting accounting information from the communication network, and for other types of charging systems. For example, the charging system may include the functions for processing the accounting information for a communication session and providing charging status information to the subscriber of the corresponding communication service without necessarily including all of the functions of an OFCS or an OCS.

In long term evolution (LTE) networks, it is common to expect subscriber sessions that last from a couple of hours to a day or more. In such cases, it is inefficient to create a charging data record (CDR) at the end of the session, since it is very likely that the subscriber may have overshot the allocated quota of consumption (data volume or connection time or a combination involving both) and consequently, a different charging rate would have kicked in. A post facto alert to the subscriber is seldom considered a good choice, as it causes subscriber dissatisfaction and possible churn. It is required for the network to keep the subscriber informed about his/her consumption quantum, and if appropriate, provide a timely alert to the fact that continuation of an ongoing session is likely to be charged differentially and a session continuation is construed as a tacit subscriber concurrence to this differential charging. It is typical also to provide advance notification at a preset consumption % of the monthly consumption limits.

Handling post-paid service delivery poses the following problems: i) the concept of "quota reservation" using post-paid charging is not defined in the standards; ii) post-paid charging is not associated with typical "advice of charging" (AoC); iii) post-paid charging is near real-time; and iv) post-paid charging does not provide call control (such as service delivery termination upon low balance).

For LTE networks, the packet data network (PDN) gateway (PGW) and serving gateway (SGW) are in the data path, with the user equipment (UE) connecting via the SGW to the PGW and further on to the Internet. Therefore, the problem requires session accounting and AoC alerts working with the SGW/PGW. The subscription information, including applicable rates and quota allocation, is maintained in an OCS, such as an Instant Convergent Charging (ICC) Suite from Alcatel-Lucent of Paris, France. The OCS, for example, supports the Diameter Ro interface. Further complications may arise if the SGW and PGW do not support the Diameter Ro interface. The SGW and PGW, however, may have the Diameter Rf interface available, which is used for Diameter offline charging. If using this latter interface, a second issue is that standards do not have a definition for AoC notifications associated with offline charging. A related challenge is that offline charging is typically not required to rate a call or session in the standards. Rating is typically done by a separate rating engine (RE), which is invoked by a downstream billing mediation (BM) system. Last, but not the least, event-based charging is inefficient for long duration communication sessions, such as long duration LTE sessions, and there is a need to provide session-based charging which is capable of one or more mid-session evaluations on subscriber consumption of time/data volume and alerting the subscriber appropriately.

In the absence of an AoC mechanism, the subscriber is subjected to nasty surprises. As an example, consider the use case of a subscriber exceeding the allocated quota that she is allowed to consume on a monthly basis. For this case, suppose the rate plan for this subscriber is that she has a total of 1 GB per month for $10/month. Then for usage exceeding that she is charged $1/10 Mbyte. It is typical to expect the subscriber to get an alert upon reaching 90% of the usage threshold and having consumed 900 Mbytes, the subscriber would be notified via an e-mail or short message service (SMS). However, if the subscriber's data session lasts 12 hours and during that time the usage gets to 2 GB without a notification being sent, the subscriber would get a bill for $110 because she didn't receive fair warning of exceeding the usage threshold. Thus, an end-of-session notification, which can be arranged via a typical offline charging scenario, is inadequate and it would result in escalations. In most cases, the service provider would agree to withdraw the overage and bear the revenue leakage. While losing money on a single subscriber session may not be an issue, it is typical to have several million subscribers in the network and then this issue remains no longer a trivial issue. Therefore, what is needed is a way to overcome the shortcomings of the SGWs and PGWs and still be able to provide an end-user alert.

A potential alternative is to have the subscribers sign-off on an end user license agreement (EULA) that contains disclaimers about the inability to forewarn them appropriately and makes them responsible for the metered usage, which is reported after the session ends. While this may be a legal protection, by no means can it be imagined as something that promotes end-user satisfaction with the service provider.

Based on the foregoing, it is desirable for a charging system to provide charging status information to a subscriber of a communication service that charges different filling rates for different usage levels during a billing cycle. Moreover, it is desirable to provide such charging status information during a communication session. There is a particular need to provide such charging status information even when the charging trigger functions participating in the communication service provide accounting information that is compatible with an offline charging system.

SUMMARY

In one aspect, a method for providing charging status information to a subscriber of a communication service is provided. In one embodiment, the method includes: receiving a current accounting request (ACR) from an NE of a communication network at a CCF subsystem of a charging system, the communication network associated with a service provider, the current ACR associated with a communication service provided to a subscriber by the service provider via the NE in conjunction with a communication session, the subscriber subject to a rate plan with the service provider that applies different billing rates for different usage levels of the communication service over a periodic billing cycle, the current ACR including an incremental volume parameter indicating usage of the communication service for the communication session since a previous ACR; converting the current ACR to a current credit control request (CCR), the current CCR including an incremental usage parameter representing the incremental volume parameter and indicating the usage of the communication service for the communication session since a previous CCR; sending the current CCR from the CCF subsystem to a quota monitoring function (QMF) subsystem of the charging system; adding the usage associated with the incremental volume parameter of the current CCR to a previously consumed amount of communication service used by the subscriber in relation to a current billing cycle to form a total consumed amount; and comparing the total consumed amount to a threshold value associated with a quota value for a first usage level of the communication service.

In another aspect, an apparatus for providing charging status information to a subscriber of a communication service is provided. In one embodiment, the apparatus includes: a CCF subsystem for receiving a current ACR from an NE of a communication network, the communication network associated with a service provider, the current ACR associated with a communication service provided to a subscriber by the service provider via the NE in conjunction with a communication session, the subscriber subject to a rate plan with the service provider that applies different billing rates for different usage levels of the communication service over a periodic billing cycle, the current ACR including an incremental volume parameter indicating usage of the communication service for the communication session since a previous ACR, wherein the CCF subsystem is also for converting the current ACR to a current CCR, the current CCR including an incremental usage parameter representing the incremental volume parameter and indicating the usage of the communication service for the communication session since a previous CCR; and a QMF subsystem in operative communication with the CCF subsystem, wherein the CCF subsystem is also for sending the current CCR to the QMF subsystem, wherein the QMF subsystem is for adding the usage associated with the incremental volume parameter of the current CCR to a previously consumed amount of communication service used by the subscriber in relation to a current billing cycle to form a total consumed amount and comparing the total consumed amount to a threshold value associated with a quota value for a first usage level of the communication service.

In yet another aspect, a non-transitory computer-readable medium storing first program instructions is provided. When executed by a first computer, the first program instructions cause a corresponding computer-controlled CCF subsystem in a charging system to perform a method for providing charging status information to a subscriber of a communication service. In one embodiment, the method includes: converting a current ACR received from an NE of a communication network at a CCF subsystem of a charging system to a current CCR, the communication network associated with a service provider, the current ACR associated with a communication service provided to a subscriber by the service provider via the NE in conjunction with a communication session, the subscriber subject to a rate plan with the service provider that applies different billing rates for different usage levels of the communication service over a periodic billing cycle, the current ACR including an incremental volume parameter indicating usage of the communication service for the communication session since a previous ACR, the current CCR including an incremental usage parameter representing the incremental volume parameter and indicating the usage of the communication service for the communication session since a previous CCR; and sending the current CCR from the CCF subsystem to a QMF subsystem of the charging system.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 8, in combination with FIG. 3, is a flow chart of another exemplary embodiment of a process for providing charging status information to a subscriber of a communication service;

FIG. 9, in combination with FIG. 3, is a flow chart of yet another exemplary embodiment of a process for providing charging status information to a subscriber of a communication service;

DETAILED DESCRIPTION

Various embodiments of a charging system and methods for providing charging status information to a subscriber of a communication service are disclosed herein. The exemplary embodiments describe how the charging system receives accounting information from a communication network in conjunction with communication sessions to which the subscriber is a participant, determines charging status information for the subscriber, and periodically communicates charging status information to a user device associated with the subscriber.

In one embodiment, various embodiments described herein provide subscriber alerts via the charging system using an offline CCF in conjunction with online charging and rating functionality for LTE data sessions in a "session mode" (as opposed to an "event" mode, which is typical post facto and ineffective for AoC alerts). In other embodiments, other types of communication networks may be served by the charging system.

Figure 1:
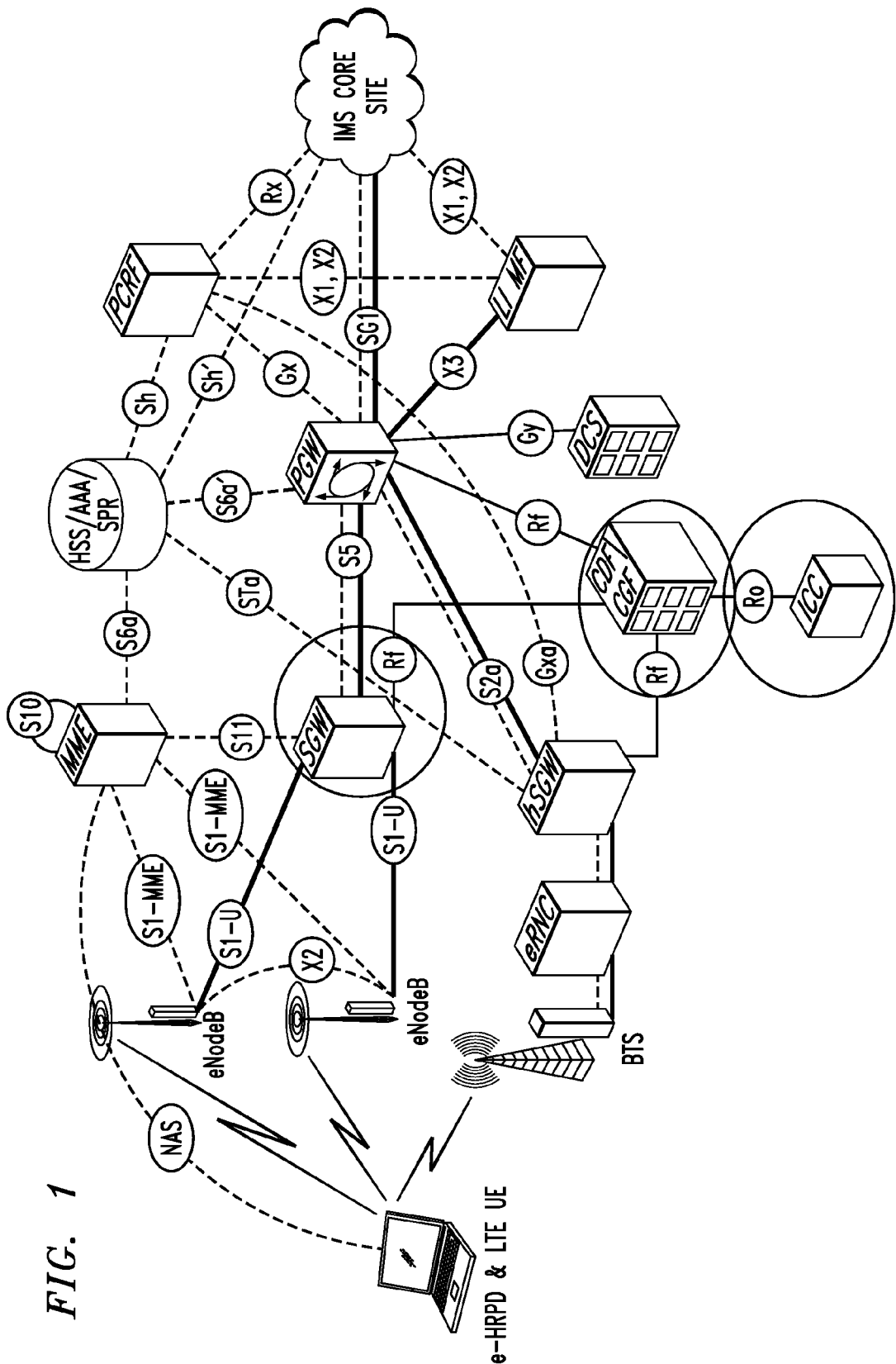
FIG. 1 is a functional diagram showing an exemplary embodiment of a charging system for collecting accounting information from an LTE communication network and providing charging status information to subscribers.

With reference to FIG. 1, in one exemplary embodiment, the charging system uses elements from a SGW, an Instant Enhanced Charging Collection Function (IECCF) from Alcatel-Lucent of Paris, France, and an ICC Suite from Alcatel-Lucent of Paris, France to interact in a way so that subscribers can be provided with timely AoC. The AoC, for example, is generated upon reaching configurable thresholds of data consumption. The IECCF is merely an exemplary commercial embodiment of a CCF subsystem. It is understood that the charging system of FIG. 1 may include any suitable CCF subsystem. Similarly, the ICC Suite is merely an exemplary commercial embodiment of a QMF subsystem. It is understood that the charging system of FIG. 1 may include any suitable QMF subsystem.

Figure 15:
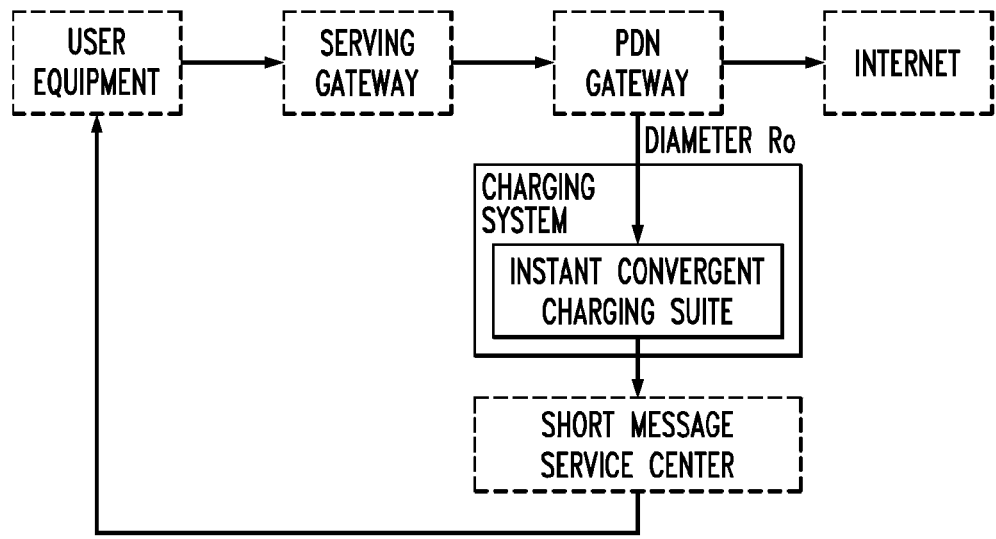
FIG. 15 is a block diagram of another exemplary embodiment of a charging system for providing charging status information to a subscriber of a communication service.

One arrangement of communication network and charging system components for providing charging status information to subscribers is provided in FIG. 15. However, this arrangement requires the PGW of the communication network to be able to communicate with an online subsystem of the charging system via an online charging interface protocol (e.g., Diameter Ro).

Figure 16:
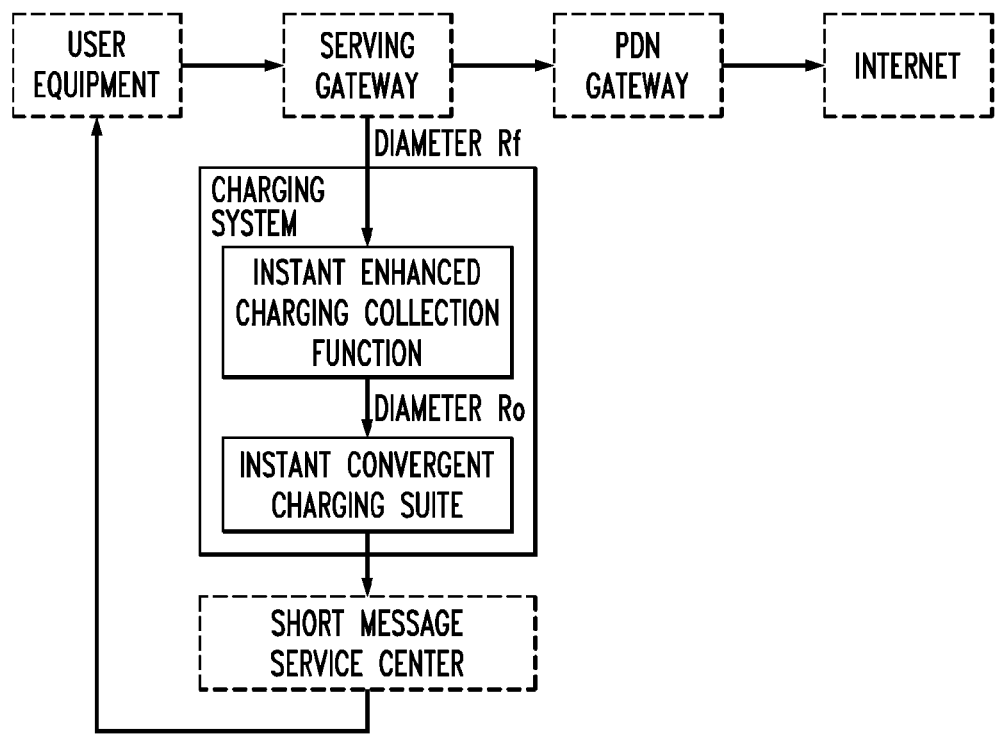
FIG. 16 is a block diagram of yet another exemplary embodiment of a charging system for providing charging status information to a subscriber of a communication service.

Another arrangement of communication network and charging system components for providing charging status information to subscribers is provided in FIG. 16. This arrangement can be used where the communication network components are not able to communicate via an online charging interface protocol (e.g., Diameter Ro), but are able to communicate with an offline subsystem of the charging system via an offline charging system interface protocol (e.g., Diameter Rf).

With reference again to FIG. 1, the introduction of the IECCF (or similar CCF subsystem) provides a mediator between the Diameter Rf and Ro interfaces. The IECCF receives ACRs from the SGW on the Diameter Rf interface, and generates partial and final CDRs, as needed. For each partial or final CDR generated, the IECCF sends a message to the ICC (or similar OCS) via the Diameter Ro interface. Thus, the IECCF is engaged in the session, providing session updates when due, and ICC can manipulate the subscriber quota based on the reported consumption.

ICC is responsible for generating the alerts upon reaching consumption thresholds warranting subscriber notifications, as the following use cases depict. In a first use case, the ICC maintains a cumulative monthly tracking of the connected time. For connected time below a certain value (e.g., 10 hours) the subscriber is charged a flat rate (e.g., $20). For connected time above this threshold, the subscriber is charged an additional amount per hour (e.g., $3/hour). After the connection time exceeds 50 percent, 90 percent, and 100 percent of the threshold time, the ICC sends notifications (e.g., SMS or e-mail) to the subscriber alerting them to the threshold crossing.

In a second use case, the ICC maintains a cumulative monthly tracking of the octets used. For octets usage below a certain value (e.g., 1 Gbyte) the subscriber is charged a flat rate (e.g., $20). For octets usage above this threshold, the subscriber is charged an additional amount per 10 Mbyte (e.g., $3/100 Mbyte). After the octets usage exceeds 50 percent, 90 percent, and 100 percent of the threshold usage, the ICC sends notifications (e.g., SMS or e-mail) to the subscriber alerting them to the threshold crossing.

For the various embodiments disclosed herein, time limits and volume (usage) limits are set at the SGW. Then, if the time or volume exceeds the limit, the SGW sends an ACR with a change condition indicating that IECCF must cut a partial CDR for the usage up until that point (actually between the previous partial CDR and this point). This will ensure that usage data is reported to ICC in a timely fashion. For example, in the case of the 1 GB threshold, the SGW could be configured with a volume limit of 10 MB. Then, if IECCF sends a CCR for each partial SGW-CDR it creates, the ICC will get periodic updates of the usage in 10 MB increments. Under these circumstances, the ICC will be able to send the e-mail or SMS to the subscriber before the 1 GB usage limit is reached.

This embodiment positions the IECCF (or similar OFCS) as a mediator between the SGW (or other charging trigger function) of the communication network, communicating via Diameter Rf interface, and the ICC (or similar OCS), communicating via Diameter Ro interface. In one embodiment, the session charging with unit reservation (SCUR) method is used. The SCUR method is typically used in SOUR scenarios for pre-paid usage.

For additional information on the Diameter protocol, ACR structure, and CCR structure see RFC 3588—Diameter Base Protocol, September 2003; RFC 4006—Diameter Credit-Control Application, August 2005; and 3GPP TS 32.299—Telecommunication Management: Charging Management: Diameter Charging Applications (Release 6), September 2007. The contents of these documents are fully incorporated herein by reference.

Figure 2:
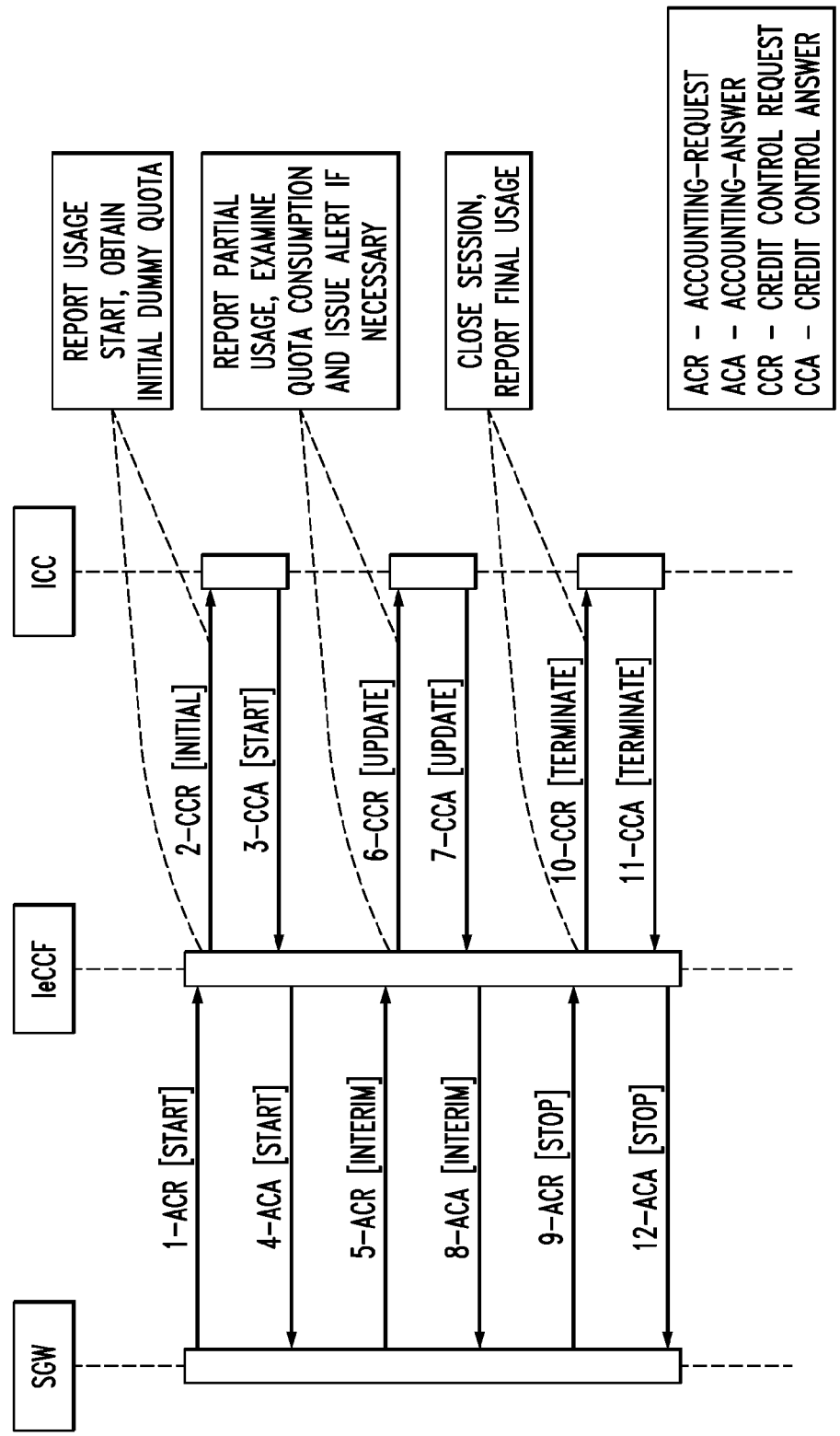
FIG. 2 is a message flow diagram showing several exemplary messaging scenarios between the LTE communication network and several components of the charging system of FIG. 1.

With reference to FIG. 2, when a subscriber session begins, the SGW provides information about the session start via sending an ACR [Start] to the IECCF (step. The IECCF communicates this session start to the ICC via sending a CCR via the Diameter Ro interface (step 2). In step 3, the ICC responds with a credit control answer (CCA). This is communicated via an accounting answer (ACA) [Start] by the IECCF to the SGW.

Assuming SGW has been provisioned to report partial session usage based on consumed data, or a span of time, and this trigger occurs on the SGW, the SGW reports this via sending an ACR [Interim] (step 5). If this ACR [Interim] contains a trigger for generating a partial CDR at the IECCF, the IECCF creates a partial CDR and reports the usage (quantum of data consumed and the span of connectivity) via a CCR [Update] message (step 6). ICC responds via a CCA (step 7), which is reflected via an ACA [Interim] by the IECCF to SGW (step 8). Steps 9-12 show the session termination sequence, with IECCF reporting the last set of usage in the CCR [Terminate] message (step 10).

In this message sequence, steps 5-8 may be repeated several times, each time the SGW needs to report partial usage. This frequent reporting is supported by setting a small duration for reporting (e.g., every 5 minutes) and also by setting a small volume for data consumption (e.g., every 10 MB) at the SGW. This ensures that the ICC gets frequent updates on connection duration and/or data quantum consumed.

The attribute-value pairs (AVPs) used in the messaging are provided below. For additional information on AVPs associated with ACRs see RFC 3588—Diameter Base Protocol, September 2003. For additional information on AVPs associated with CCRs see RFC 4006—Diameter Credit-Control Application, August 2005. The contents of these documents are fully incorporated herein by reference.

Though SCUR implies unit reservation prior to service delivery start, as described herein, this is not required. The service delivery starts and the SGW informs the IECCF via an ACR [Start], which is to be converted into an initial CCR and sent to the ICC. This initial CCR may include information about quota requested, via Requested-Service-Unit AVP, for initial grant of quota. However, in this embodiment, an empty Requested-Service-Unit AVP is sent in the CCR. The "quota allocation" is taken care of by ICC and the allocated units information in the response CCA can be discarded.

With continuing reference to FIG. 2, in step 1, the SGW sends an ACR [Start] to IECCF to indicate the beginning of a new accounting session. This ACR may include the following AVPs:
  Session-Id
  Origin-Host
  Origin-Realm
  Destination-Realm
  Accounting-Record-Type
  Accounting-Record-Number
  Acct-Application-Id
  Origin-State-Id
  Service-Context-Id
  Service-Information In step 2, the IECCF sends a CCR (Initial Request) to the ICC. This CCR may include the following AVPs:
  Session-Id
  Auth-Application-Id
  Origin-Host
  Origin-Realm
  Destination-Realm
  CC-Request-Type=1//INITIAL-REQUEST
  CC-Request-Number=0
  Service-Context-Id
  Subscription-Id
  Multiple-Services-Indicator//Optional (Multiple-Services support is assumed for any 3GPP context)
  Multiple-Services-Credit-Control//Optional (See the following note)
  Rating-Group=1//The value 1 is only an example
  Requested-Service-Unit//This AVP would be empty for unit determination by ICC
  Service-Information//with eventual PS-Information The multiple services credit control (MSCC) AVP is optional in the initial request. If MSCC is missing in CCR (Initial), ICC will look for Service-Id or Rating-Group at root level of the message or (in absence of Service-Id and Rating-Group) the Default-Service-Id will be used to characterize the requested reservation.

In step 3, the ICC responds with a CCA. The CCA may include the following AVPs:
  Session-Id
  Auth-Application-Id
  Origin-Host
  Origin-Realm
  CC-Request-Type=//INITIAL-REQUEST
  CC-Request-Number=0
  Multiple-Services-Credit-Control
  Rating-Group=1
  Result-Code=DIAMETER_SUCCESS=2001
  Granted-Service-Unit
  Validity-Time
  Credit-Control-Failure-Handling
  Result-Code=DIAMETER_SUCCESS=2001

For IECCF, about the only thing of importance is a receipt of the CCA message, within the timer Tx, and indication in the Result-Code that the CCR sent earlier was successfully delivered and understood at ICC. Granted-Service-Unit and other elements do not warrant any special attention and can simply be discarded.

In step 4, the IECCF responds to the SGW by sending an ACA [Start]. The ACA may include the following AVPs:
  Session-Id
  Result-Code DIAMETER_SUCCESS=2001
  Origin-Host
  Origin-Realm
  Accounting-Record-Type
  Accounting-Record-Number
  Acct-Application-Id
  Origin-State-Id In step 5, after some time, the SGW sends an ACR [Interim] which triggers generation of a partial CDR at the IECCF. Partial CDR generation is caused for many conditions. The SGW-CDRs would be closed on the IECCF, among other reasons, for the following two cases specifically: i) upon detecting a trigger of data volume limit, a partial record would be generated at the IECCF and ii) upon detecting a trigger of time volume limit, a partial record would be generated at the IECCF.

Other conditions may cause the generation of the partial record at the IECCF as well. These conditions include: i) a radio access technology (RAT) change; ii) public land mobile network (PLMN) change; iii) mobile station (MS) time zone (TZ) change; iv) exceeding the maximum number of changes in charging conditions; and v) management intervention.

For these other conditions, the IECCF generates a partial record. The corresponding ACR [Interim] received by the IECCF may include the following AVPs:
Session-Id
Origin-Host
Origin-Realm
Destination-Realm
Accounting-Record-Type
Accounting-Record-Number
Acct-Application-Id
Origin-State-Id
Event-Timestamp
Service-Context-Id
Service-Information
PS-Information
Traffic-Data-Volumes
Accounting-Input-Octets
Accounting-Output-Octets IECCF aggregates the consumed data quanta reported in these ACR [Interim] messages until the partial record trigger is received. Specifically, the values reported in the Accounting-Input-Octets and Accounting-Output-Octets would be accumulated into the CC-Input-Octets and the CC-Output-Octets AVPs, respectively. IECCF would also calculate the total in the cc-Total-Octets AVP. Once these values are reported in the CCR to ICC, they may be cleared by the IECCF.

In step 6, the IECCF, upon generation of a partial CDR, informs ICC with a CCR (Update Request). The CCR may include the following AVPs:
Session-Id
Auth-Application-Id
Origin-Host
Origin-Realm
Destination-Realm
CC-Request-Type=2//UPDATE-REQUEST
CC-Request-Number=1
Service-Context-Id
Multiple-Services-Credit-Control
Rating-Group=1
Requested-Service-Unit//This AVP may be empty for unit determination by ICC Used-Service-Unit
Service-Information//with eventual PS-Information Under MSCC, Used-Service-Unit, the IECCF provides information on the consumed data quantum in either directions and the total, via the AVPs CC-Total-Octets, CC-Input-Octets and CC-Output-Octets.

In step 7, the ICC responds with a CCA. The CCA may include the following AVPs:
Session-Id
Auth-Application-Id
Origin-Host
Origin-Realm
CC-Request-Type=2//UPDATE-REQUEST
CC-Request-Number=1
Multiple-Services-Credit-Control
Rating-Group=1
Result-Code=DIAMETER_SUCCESS=2001
Granted-Service-Unit
Validity-Time
Credit-Control-Failure-Handling
Result-Code=DIAMETER_SUCCESS=2001

As before, the receipt of the CCA with a success indication is what the IECCF is looking for.

In step 8, the IECCF responds to the SGW with an ACA [Interim] to close the dialog initiated at step 5. Steps 5-8 may repeat several times, potentially for different trigger conditions at the SGW. Each time step 6 is executed, the ICC manipulates the subscriber quota and checks the remaining quota against the rate plan provisioned for the subscriber. In case the remaining quota requires sending a threshold alert, ICC provides this alert, working with SMS center (SMSC) (not shown).

Finally, in step 9, the accounting session terminates after the SGW sends an ACR [Stop] which triggers generation of a final SGW-CDR for the session at the IECCF. The conditions for which this would happen are: i) internet protocol (IP) connectivity access network (CAN) bearer deactivation/termination; ii) inter-SGW handover; iii) inter-system change (e.g., handover between LTE and evolved high rate packet data (eHRPD)); and iv) abnormal release.

In step 10, the IECCF creates a final SGW-CDR for the session and sends a CCR (Terminate Request) to the ICC. The CCR may include the following AVPs:
Session-Id
Auth-Application-Id
Origin-Host
Origin-Realm
Destination-Realm
CC-Request-Type=3//TERMINATION-REQUEST
CC-Request-Number=2
Service-Context-Id
Multiple-Services-Credit-Control
Rating-Group=1
Used-Service-Unit As before, the Used-Service-Unit would have the AVPs carrying the information about consumed data as input, output and total.

In step 11, the ICC responds to the IECCF with a CCA. The CCA may include the following AVPs:
Session-Id
Auth-Application-Id
Origin-Host
Origin-Realm
CC-Request-Type=3//TERMINATION-REQUEST
CC-Request-Number=2
Multiple-Services-Credit-Control
Rating-Group=1
Result-Code=DIAMETER_SUCCESS=2001

Again, the IECCF is looking for the CCA to include a success indication. Other information in the CCA is not pertinent.

In step 12, the IECCF sends an ACA [Stop] to the SGW and close the dialog.

Figure 3:
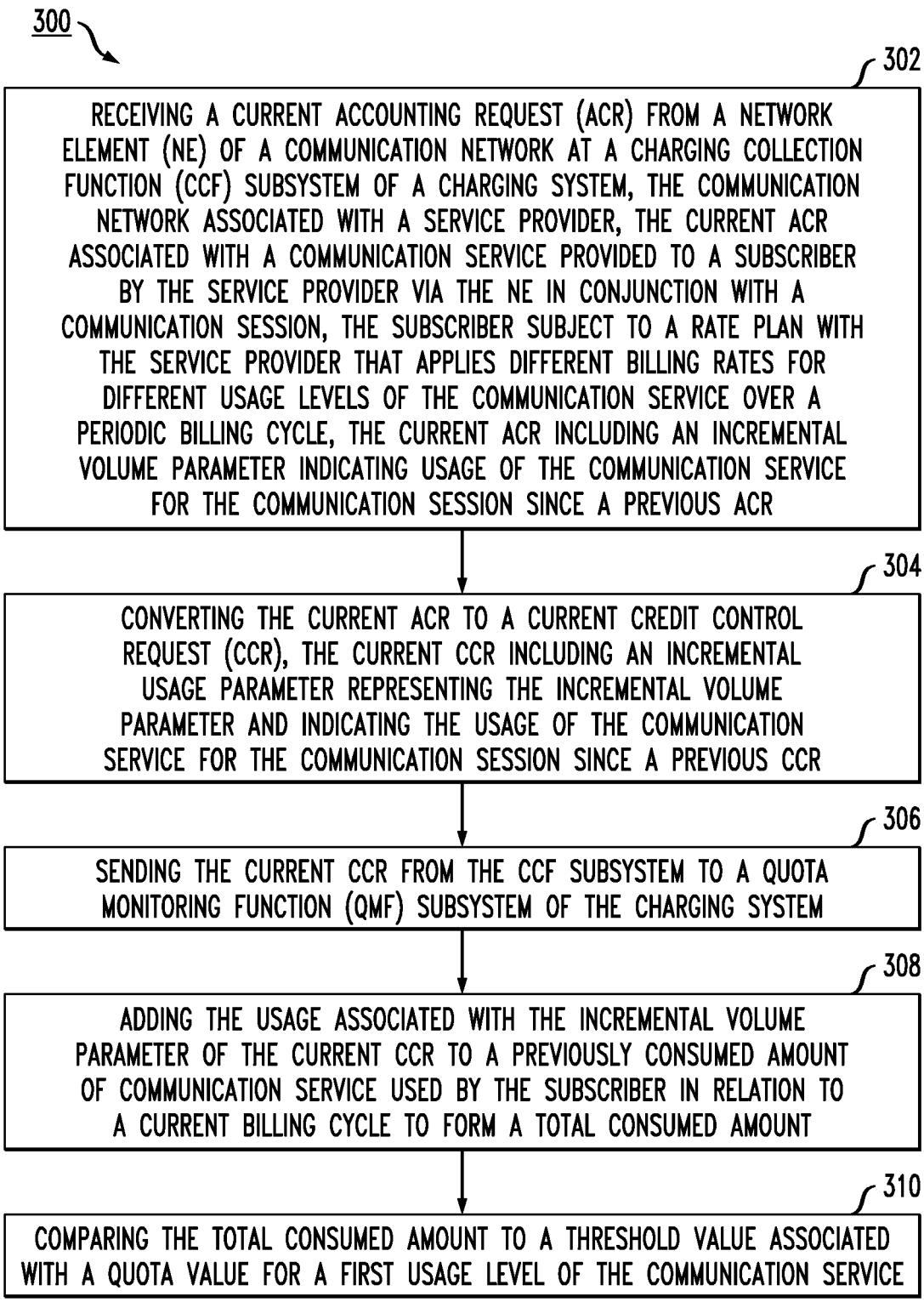
FIG. 3 is a flow chart of an exemplary embodiment of a process for providing charging status information to a subscriber of a communication service.

Referring again to the drawings wherein the showings are for purposes of illustrating the exemplary embodiments only and not for purposes of limiting the claimed subject matter, FIG. 3 depicts an exemplary embodiment of a process 300 for providing charging status information to a subscriber of a communication service begins at 302 where a current ACR is received from an NE of a communication network at a CCF subsystem of a charging system. In other embodiments, the charging system may include an OFCS and the CCF subsystem may be part of the OFCS. The communication network associated with a service provider. The current ACR associated with a communication service provided to a subscriber by the service provider via the NE in conjunction with a communication session. The subscriber subject to a rate plan with the service provider that applies different billing rates for different usage levels of the communication service over a periodic billing cycle. The current ACR including an incremental volume parameter indicating usage of the communication service for the communication session since a previous ACR.

At 304, the current ACR is converted to a current CCR. The current CCR including an incremental usage parameter representing the incremental volume parameter and indicating the usage of the communication service for the communication session since a previous CCR. Next, the current CCR is sent from the CCF subsystem to a QMF subsystem of the charging system (306). In other embodiments, the charging system may include an OCS and the QMF subsystem may be part of the OCS. At 308, the usage associated with the incremental volume parameter of the current CCR is added to a previously consumed amount of communication service used by the subscriber in relation to a current billing cycle to form a total consumed amount. Next, the total consumed amount is compared to a threshold value associated with a quota value for a first usage level of the communication service (310).

In another embodiment of the process 300, the threshold value is 50 percent of the quota value for the first usage level. In yet another embodiment of the process 300, the threshold value is 90 percent of the quota value for the first usage level. In still another embodiment of the process 300, the threshold value is 100 percent of the quota value for the first usage level.

In still yet another embodiment of the process 300, the communication network comprises an LTE communication network. In a further embodiment of the process 300, the NE comprises an SGW. In another further embodiment of the process 300, the NE comprises a PGW. In yet another further embodiment of the process 300, the NE comprises a high rate packet data (HRPD) serving gateway (HSGW). In still another further embodiment of the process 300, the NE comprises an evolved packet data gateway (ePDG).

In another embodiment of the process 300, the current ACR comprises an interim ACR and the current CCR comprising a CCR update request. In yet another embodiment of the process 300, the current ACR comprises a stop ACR and the current CCR comprising a CCR termination request.

In still another embodiment of the process 300, the CCF subsystem comprises an instant enhanced CCF (IECCF) server. In still yet another embodiment of the process 300, the current ACR is compatible with an offline charging interface protocol for charging system communications. In a further embodiment of the process 300, the offline charging interface protocol comprises an Rf interface protocol associated with a Diameter base protocol.

In another embodiment of the process 300, the rate plan, billing rates, usage levels, incremental volume parameter, threshold value, and quota value are defined in relation to connect time units. In yet another embodiment of the process 300, the rate plan, billing rates, usage levels, incremental volume parameter, threshold value, and quota value are defined in relation to data measurement units.

In still another embodiment of the process 300, the current CCR is compatible with an online charging interface protocol for charging system communications. In a further embodiment of the process 300, the online charging interface protocol comprises an Ro interface protocol associated with a Diameter base protocol. In still yet another embodiment of the process 300, the QMF subsystem comprises an instant convergent charging (ICC) suite.

In another embodiment of the process 300, the previously consumed amount is stored in a subscriber profile storage device (e.g., subscriber profile repository (SPR)) accessible to the QMF subsystem. In yet another embodiment of the process 300, the threshold value and quota value are stored in a subscriber profile storage device (e.g., SPR) accessible to the QMF subsystem. In still another embodiment of the process 300, the quota value represents a predetermined consumed amount at which the rate plan changes a current billing rate to a different billing rate associated with a second usage level.

Figure 4:
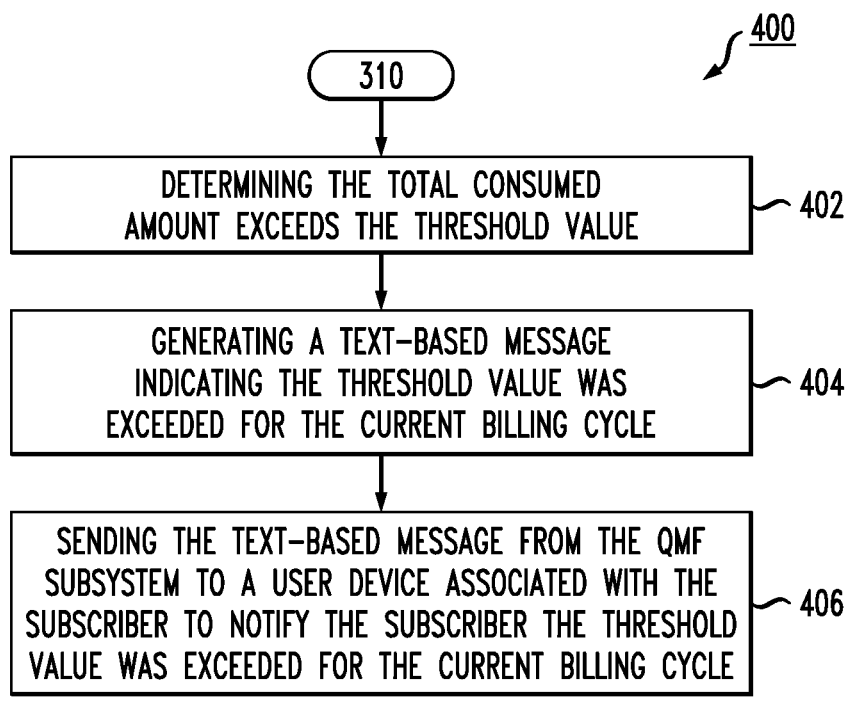
FIG. 4, in combination with FIG. 3, is a flow chart of another exemplary embodiment of a process for providing charging status information to a subscriber of a communication service.

With reference to FIGS. 3 and 4, another exemplary embodiment of a process 400 for providing charging status information to a subscriber of a communication service includes the process 300 of FIG. 3 and continues from 310 to 402 where the QMF subsystem determines the total consumed amount exceeds the threshold value. Next, a status message indicating the threshold value was exceeded for the current billing cycle is generated (404). At 406, the status message is sent from the QMF subsystem to a user device associated with the subscriber to notify the subscriber the threshold value was exceeded for the current billing cycle.

In another embodiment of the process 400, the status message is sent via an e-mail service provided to the subscriber via the communication network. In yet another embodiment of the process 400, the status message is sent via an SMS provided to the subscriber via the communication network. In still another embodiment of the process 400, the user device to which the status message is sent is participating in the communication session.

In other embodiments, the status message may be sent via any suitable communication service using either bearer or control communication channels. The status message, for example, may include a text-based message, an audio-based message, a visual-based message, a multimedia message, or any other suitable type of communication message. A text-based message, for example, may include an SMS message, an instant message (IM), an e-mail, or a trigger signal for a text alert stored at the user device (e.g., pop-up window, text status line, etc.). An audio-based message, for example, may include audio embedded in an SMS message, an IM, an e-mail, or a trigger signal for an audio alert stored at the user device (e.g., ring tone). An visual-based message, for example, may include video, images, or icons embedded in an SMS message, an IM, an e-mail, or a trigger signal for an visual alert stored at the user device (e.g., flashing or highlighted indicator or icon). A multimedia message, for example, may include any suitable combination of text, audio, or visual-based messages or any suitable combination of trigger signals for text, audio, or visual alerts stored at the user device. For example, a "read me" screen can be presented on the user device that states "Dear customer, you have now exhausted your allocated quota. If you wish to continue, your session will be charged at a different rate under your current rate plan and EULA."

Figure 5:
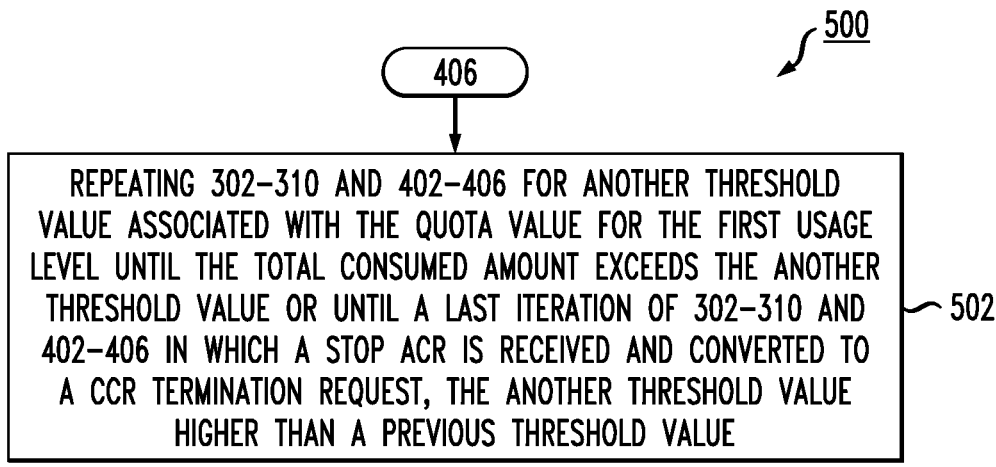
FIG. 5, in combination with FIGS. 3 and 4, is a flow chart of yet another exemplary embodiment of a process for providing charging status information to a subscriber of a communication service.

With reference to FIGS. 3-5, another exemplary embodiment of a process 500 for providing charging status information to a subscriber of a communication service includes the processes 300, 400 of FIGS. 3 and 4 and continues from 406 to 502 where 302 through 310 and 402 through 406 are repeated for another threshold value associated with the quota value for the first usage level until the total consumed amount exceeds the another threshold value or until a last iteration of the processes 300, 400 of FIGS. 3 and 4 in which a stop ACR is received and converted to a CCR termination request. In this embodiment, the another threshold value is higher than a previous threshold value.

Figure 6:
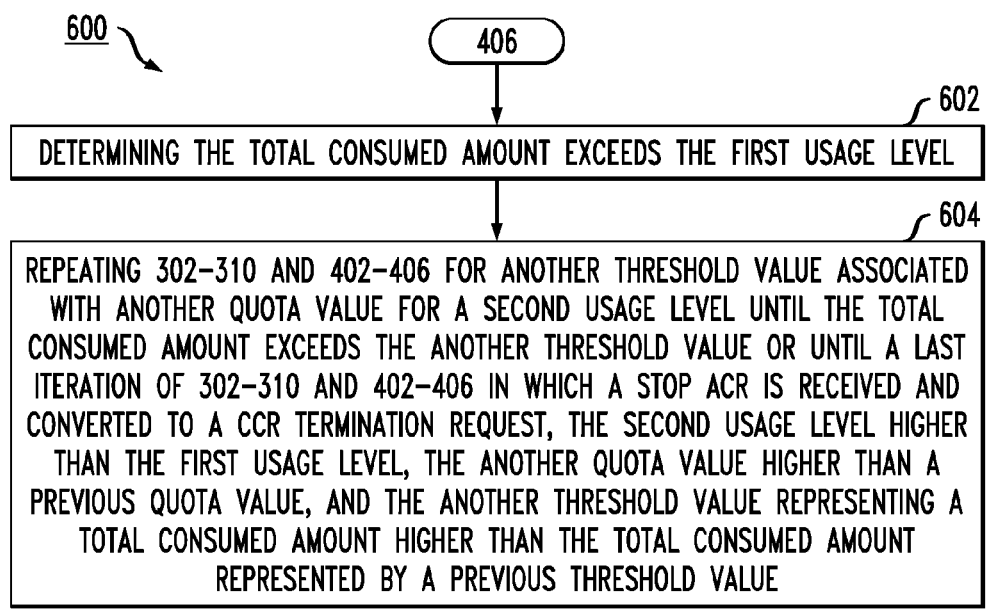
FIG. 6, in combination with FIGS. 3 and 4, is a flow chart of still another exemplary embodiment of a process for providing charging status information to a subscriber of a communication service.

With reference to FIGS. 3, 4, and 6, another exemplary embodiment of a process 600 for providing charging status information to a subscriber of a communication service includes the processes 300, 400 of FIGS. 3 and 4 and continues from 406 to 602 where the QMF subsystem determines the total consumed amount exceeds the first usage level. At 604, 302 through 310 and 402 through 406 are repeated for another threshold value associated with another quota value for a second usage level until the total consumed amount exceeds the another threshold value or until a last iteration of the processes 300, 400 of FIGS. 3 and 4 in which a stop ACR is received and converted to a CCR termination request. In this embodiment, the second usage level is higher than the first usage level, the another quota value is higher than a previous quota value, and the another threshold value represents a total consumed amount higher than the total consumed amount represented by a previous threshold value.

Figure 7:
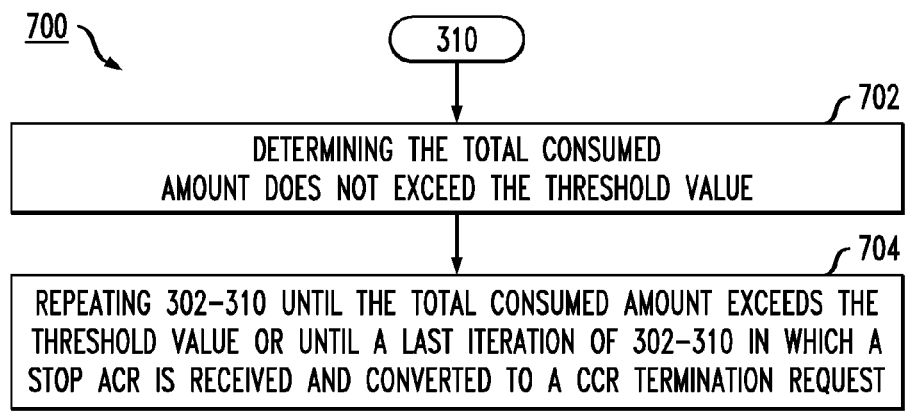
FIG. 7, in combination with FIG. 3, is a flow chart of still yet another exemplary embodiment of a process for providing charging status information to a subscriber of a communication service.

With reference to FIGS. 3 and 7, another exemplary embodiment of a process 700 for providing charging status information to a subscriber of a communication service includes the process 300 of FIG. 3 and continues from 310 to 702 where the QMF subsystem determines the total consumed amount does not exceed the threshold value. At 704, 302 through 310 are repeated until the total consumed amount exceeds the threshold value or until a last iteration of 302 through 310 in which a stop ACR is received and converted to a CCR termination request.

With reference to FIGS. 3 and 8, another exemplary embodiment of a process 800 for providing charging status information to a subscriber of a communication service includes the process 300 of FIG. 3. In this embodiment, the process 800 begins at 802 where at least one previous ACR is received from the communication network at the CCF subsystem associated with the communication service provided to the subscriber by the service provider in conjunction with the communication session. The at least one previous ACR including the incremental volume parameter indicating usage of the communication service for the communication session since a most recent previous ACR. At 804, for each at least one previous ACR, the CCF subsystem determines the corresponding at least one previous ACR does not include a volume limit parameter indicating a predetermined incremental volume limit was exceeded in conjunction with the communication session since the most recent previous ACR. Next, for each at least one previous ACR, the usage from the incremental volume parameter of the corresponding at least one previous ACR is added to an incremental consumed amount stored in a volume limit storage device accessible to the CCF subsystem (806). In this embodiment, the process 800 continues to 302 of the process 300 of FIG. 3.

In another embodiment, the process 800 also includes determining the current ACR includes the volume limit parameter and indicates the predetermined incremental volume limit was exceeded in conjunction with the communication session since the most recent previous ACR (808). In this embodiment, at 810, the usage from the incremental volume parameter of the current ACR is added to the incremental consumed amount stored in the volume limit storage device to form the incremental usage parameter for the current CCR. In the embodiment being described, the process 800 continues to 302 of the process 300 of FIG. 3. In yet another embodiment, the process 800 also includes clearing the incremental consumed amount stored in the volume limit storage device.

With reference to FIGS. 3 and 9, another exemplary embodiment of a process 900 for providing charging status information to a subscriber of a communication service includes the process 300 of FIG. 3. In this embodiment, the process 900 begins at 902 where at least one previous ACR is received from the communication network at the CCF subsystem associated with the communication service provided to the subscriber by the service provider in conjunction with the communication session. The at least one previous ACR including the incremental volume parameter indicating usage of the communication service for the communication session since a most recent previous ACR. At 904, for each at least one previous ACR, the usage from the incremental volume parameter of the corresponding at least one previous ACR is added to an incremental consumed amount stored in a volume limit storage device accessible to the CCF subsystem. Next, for each at least one previous ACR, the incremental consumed amount is compared to a volume limit threshold representing a predetermined incremental volume limit between consecutive CCRs for the communication session (906). At 908, for each at least one previous ACR, the CCF subsystem determines the incremental consumed amount does not exceed the volume limit threshold. In this embodiment, the process 900 continues to 302 of the process 300 of FIG. 3.

In another embodiment, after receiving the current ACR in 302, the process 900 also includes adding the usage from the incremental volume parameter of the current ACR to the incremental consumed amount stored in the volume limit storage device (910). At 912, the incremental consumed amount is compared to the volume limit threshold. Next, the CCF subsystem determines the incremental consumed amount exceeds the volume limit threshold (914). At 916, the incremental consumed amount is used to form the incremental usage parameter for the current CCR in 304. In yet another embodiment, the process 900 also includes clearing the incremental consumed amount stored in the volume limit storage device.

Figure 10:
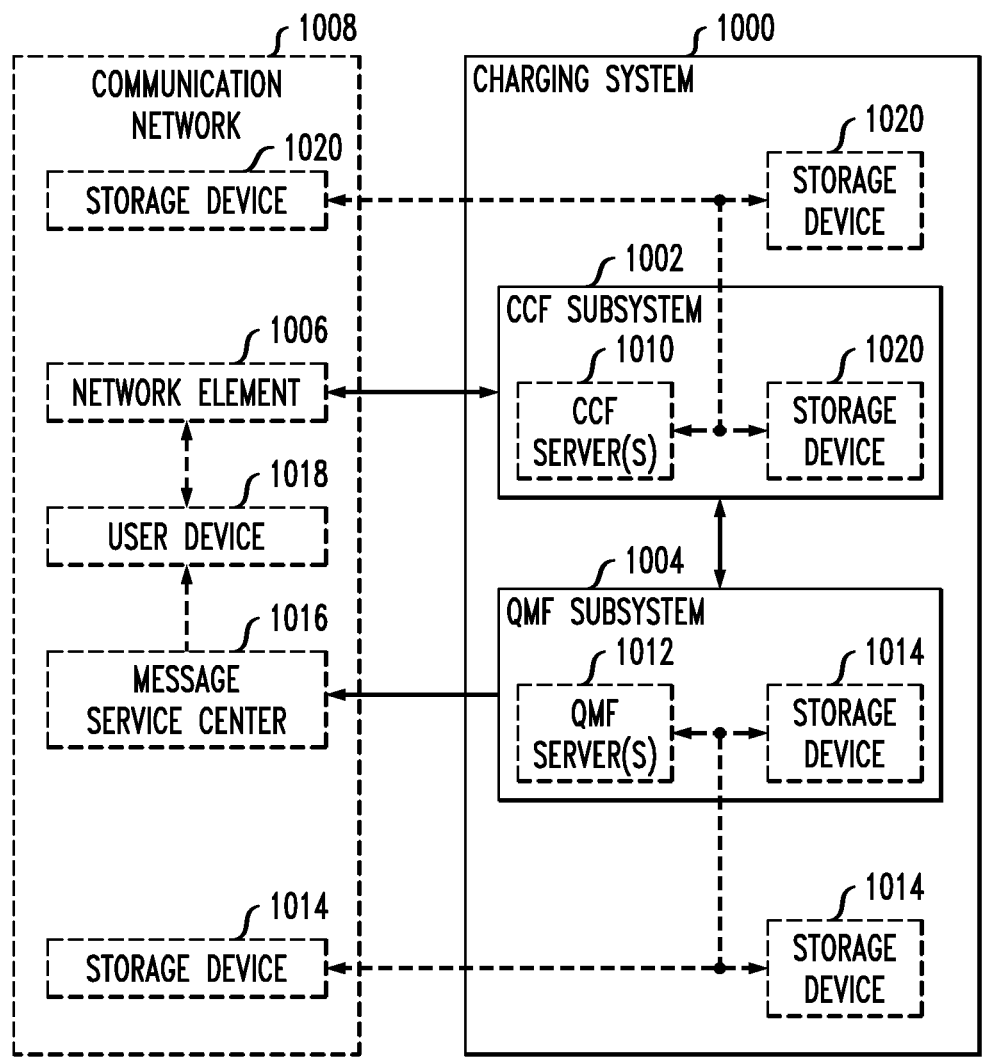
FIG. 10 is a block diagram of an exemplary embodiment of a charging system for providing charging status information to a subscriber of a communication service.

With reference to FIG. 10, an exemplary embodiment of a charging system 1000 for providing charging status information to a subscriber of a communication service includes a CCF subsystem 1002 and a QMF subsystem 1004. The CCF subsystem 1002 for receiving a current ACR from an NE 1006 of a communication network 1008. The communication network 1008 associated with a service provider. The current ACR associated with a communication service provided to a subscriber by the service provider via the NE 1006 in conjunction with a communication session. The subscriber subject to a rate plan with the service provider that applies different billing rates for different usage levels of the communication service over a periodic billing cycle. The current ACR including an incremental volume parameter indicating usage of the communication service for the communication session since a previous ACR. The CCF subsystem 1002 is also for converting the current ACR to a current CCR. The current CCR including an incremental usage parameter representing the incremental volume parameter and indicating the usage of the communication service for the communication session since a previous CCR. The CCF subsystem 1002 may include one or more CCF servers 1010 and additional components to support the CCF servers 1010.

The QMF subsystem 1004 in operative communication with the CCF subsystem so that the CCF subsystem 1002 can send the current CCR to the QMF subsystem 1004. The QMF subsystem 1004 for adding the usage associated with the incremental volume parameter of the current CCR to a previously consumed amount of communication service used by the subscriber in relation to a current billing cycle to form a total consumed amount. The QMF subsystem 1004 also for comparing the total consumed amount to a threshold value associated with a quota value for a first usage level of the communication service. The QMF subsystem 1004 may include one or more QMF servers 1012 and additional components to support the QMF servers 1012.

In another embodiment of the charging system 1000, the communication network 1008 comprises an LTE communication network. In a further embodiment of the charging system 1000, the NE 1006 comprises an SGW. In another further embodiment of the charging system 1000, the NE 1006 comprises a PGW. In yet another further embodiment of the charging system 1000, the NE 1006 comprises an HSGW. In still another further embodiment of the charging system 1000, the NE 1006 comprises an ePDG.

In yet another embodiment of the charging system 1000, the CCF subsystem 1002 includes an IECCF server. In still another embodiment of the charging system 1000, the current ACR is compatible with an offline charging interface protocol for charging system communications. In a further embodiment of the charging system 1000, the offline charging interface protocol includes an Rf interface protocol associated with a Diameter base protocol.

In still yet another embodiment of the charging system 1000, the current CCR is compatible with an online charging interface protocol for charging system communications. In a further embodiment of the charging system 1000, the online charging interface protocol includes an Ro interface protocol associated with a Diameter base protocol. In another embodiment of the charging system 1000, the QMF subsystem 1004 includes an ICC suite.

In yet another embodiment of the charging system 1000, the previously consumed amount is stored in a subscriber profile storage device 1014 accessible to the QMF subsystem 1004. In still another embodiment of the charging system 1000, the threshold value and quota value are stored in a subscriber profile storage device 1014 accessible to the QMF subsystem 1004. In various embodiments, the storage device 1014 may be within the QMF server(s) 1012, within the QMF subsystem 1004, within the charging system 1000, within the communication network 1008 (e.g., SPR), or within any suitable combination of these components.

In still yet another embodiment of the charging system 1000, the QMF subsystem 1004 is also for determining the total consumed amount exceeds the threshold value, generating a status message indicating the threshold value was exceeded for the current billing cycle, and sending the status message via a message service center 1016 in the communication network 1008 to a user device 1018 associated with the subscriber to notify the subscriber the threshold value was exceeded for the current billing cycle. In a further embodiment of the charging system 1000, the message service center 1016 includes an e-mail service provided to the subscriber via the communication network 1008 and the status message is sent via the e-mail service. In another further embodiment of the charging system 1000, the message service center 1016 includes an SMS provided to the subscriber via the communication network 1008 and the status message is sent via the SMS. In yet another further embodiment of the charging system 1000, the user device 1018 to which the status message is sent is participating in the communication session via the NE 1006. In other embodiments, the status message may be sent via any suitable communication service using either bearer or control communication channels. The status message, for example, may include a text-based message, an audio-based message, a visual-based message, a multimedia message, or any other suitable type of communication message.

In another embodiment of the charging system 1000, the CCF subsystem 1002 is also for receiving at least one previous ACR from the communication network 1008. The at least one previous ACR associated with the communication service provided to the subscriber by the service provider in conjunction with the communication session. The at least one previous ACR including the incremental volume parameter indicating usage of the communication service for the communication session since a most recent previous ACR. For each at least one previous ACR, the CCF subsystem 1002 is also for determining the corresponding at least one previous ACR does not include a volume limit parameter indicating a predetermined incremental volume limit was exceeded in conjunction with the communication session since the most recent previous ACR and adding the usage from the incremental volume parameter of the corresponding at least one previous ACR to an incremental consumed amount stored in a volume limit storage device 1020 accessible to the CCF subsystem. In various embodiments, the storage device 1020 may be within the CCF server(s) 1010, within the CCF subsystem 1002, within the charging system 1000, within the communication network 1008, or within any suitable combination of these components. In a further embodiment of the charging system 1000, the CCF subsystem 1002 is also for determining the current ACR includes the volume limit parameter and indicates the predetermined incremental volume limit was exceeded in conjunction with the communication session since the most recent previous ACR. In the embodiment being described, the CCF subsystem 1002 is also for adding the usage from the incremental volume parameter of the current ACR to the incremental consumed amount stored in the volume limit storage device 1020 to form the incremental usage parameter for the current CCR. In yet a further embodiment of the charging system 1000, the CCF subsystem 1002 is also for clearing the incremental consumed amount stored in the volume limit storage device 1020.

In yet another embodiment of the charging system 1000, the CCF subsystem 1002 is also for receiving at least one previous ACR from the communication network 1008. The at least one previous ACR associated with the communication service provided to the subscriber by the service provider in conjunction with the communication session. The at least one previous ACR including the incremental volume parameter indicating usage of the communication service for the communication session since a most recent previous ACR. For each at least one previous ACR, the CCF subsystem 1002 is also for adding the usage from the incremental volume parameter of the corresponding at least one previous ACR to an incremental consumed amount stored in a volume limit storage device 1020 accessible to the CCF subsystem 1002, comparing the incremental consumed amount to a volume limit threshold representing a predetermined incremental volume limit between consecutive CCRs for the communication session, and determining the incremental consumed amount does not exceed the volume limit threshold. In various embodiments, the storage device 1020 may be within the CCF server(s) 1010, within the CCF subsystem 1002, within the charging system 1000, within the communication network 1008, or within any suitable combination of these components. In a further embodiment of the charging system 1000, after the receiving current ACR, the CCF subsystem 1002 is also for adding the usage from the incremental volume parameter of the current ACR to the incremental consumed amount stored in the volume limit storage device 1020, comparing the incremental consumed amount to the volume limit threshold, determining the incremental consumed amount exceeds the volume limit threshold, and using the incremental consumed amount to form the incremental usage parameter for the current CCR. In yet a further embodiment of the charging system 1000, the CCF subsystem 1002 is also for clearing the incremental consumed amount stored in the volume limit storage device 1020.

Figure 11:
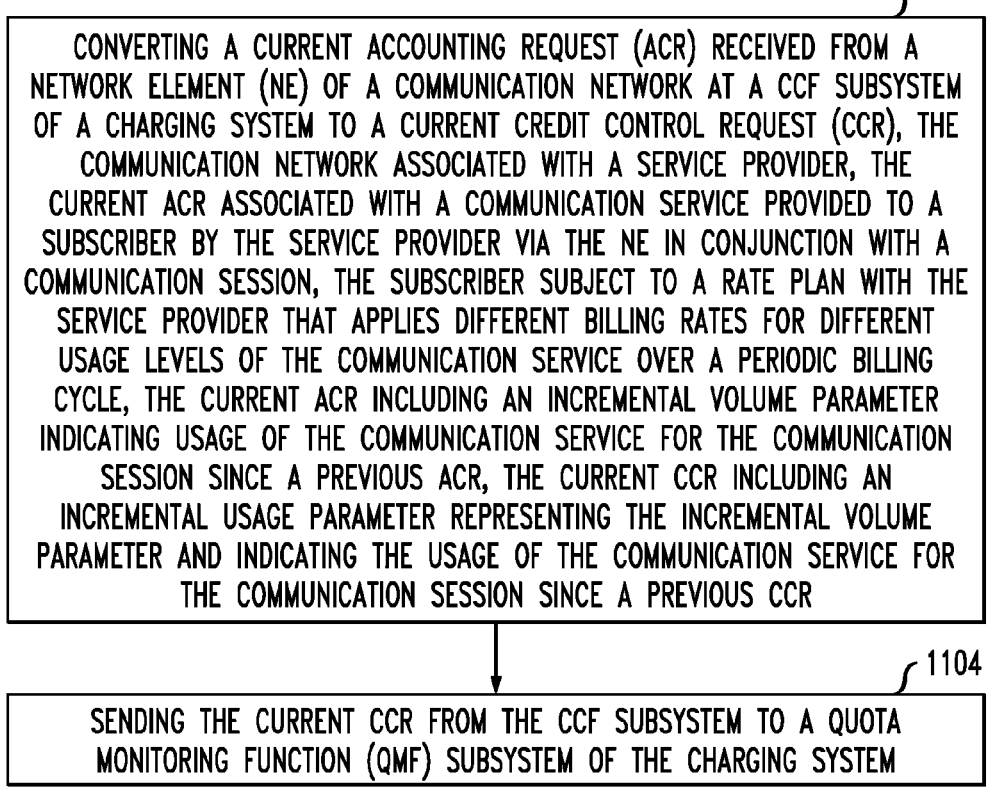
FIG. 11 is a flow chart of an exemplary embodiment of a process for providing charging status information to a subscriber of a communication service performed by a computer-controlled charging system executing program instructions stored on a non-transitory computer-readable medium.

With reference to FIG. 11, an exemplary embodiment of a non-transitory computer-readable medium storing first program instructions that, when executed by a first computer, cause a corresponding computer-controlled CCF subsystem in a charging system to perform a process 1100 for providing charging status information to a subscriber of a communication service. In one exemplary embodiment, the process 1100 begins at 1102 where a current ACR received from an NE of a communication network at a CCF subsystem of a charging system is converted to a current CCR. The communication network associated with a service provider. The current ACR associated with a communication service provided to a subscriber by the service provider via the NE in conjunction with a communication session. The subscriber subject to a rate plan with the service provider that applies different billing rates for different usage levels of the communication service over a periodic billing cycle. The current ACR including an incremental volume parameter indicating usage of the communication service for the communication session since a previous ACR. The current CCR including an incremental usage parameter representing the incremental volume parameter and indicating the usage of the communication service for the communication session since a previous CCR. At 1104, the current CCR is sent from the CCF subsystem to a QMF subsystem of the charging system.

In another embodiment of non-transitory computer-readable medium, the first program instructions, when executed by the first computer, cause the corresponding computer-controlled CCF subsystem to perform another embodiment of the process 1100 in which at least one previous ACR is received from the communication network at the CCF subsystem that is associated with the communication service provided to the subscriber by the service provider in conjunction with the communication session. The at least one previous ACR including the incremental volume parameter indicating usage of the communication service for the communication session since a most recent previous ACR. In this embodiment, for each at least one previous ACR, the process 1100 also includes determining the corresponding at least one previous ACR does not include a volume limit parameter indicating a predetermined incremental volume limit was exceeded in conjunction with the communication session since the most recent previous ACR. In the embodiment being described, for each at least one previous ACR, the process 1100 continues by adding the usage from the incremental volume parameter of the corresponding at least one previous ACR to an incremental consumed amount stored in a volume limit storage device accessible to the CCF subsystem.

In a further embodiment of non-transitory computer-readable medium, the first program instructions, when executed by the first computer, cause the corresponding computer-controlled CCF subsystem to perform a further embodiment of the process 1100 in which the CCF subsystem determines the current ACR includes the volume limit parameter and indicates the predetermined incremental volume limit was exceeded in conjunction with the communication session since the most recent previous ACR. In this embodiment, the process 1100 also includes adding the usage from the incremental volume parameter of the current ACR to the incremental consumed amount stored in the volume limit storage device to form the incremental usage parameter for the current CCR. In yet a further embodiment, the process 1100 continues by clearing the incremental consumed amount stored in the volume limit storage device.

In yet another embodiment of non-transitory computer-readable medium, the first program instructions, when executed by the first computer, cause the corresponding computer-controlled CCF subsystem to perform yet another embodiment of the process 1100 in which at least one previous ACR is received from the communication network at the CCF subsystem that is associated with the communication service provided to the subscriber by the service provider in conjunction with the communication session. The at least one previous ACR including the incremental volume parameter indicating usage of the communication service for the communication session since a most recent previous ACR. In this embodiment, for each at least one previous ACR, the process 1100 also includes adding the usage from the incremental volume parameter of the corresponding at least one previous ACR to an incremental consumed amount stored in a volume limit storage device accessible to the CCF subsystem. In the embodiment being described, for each at least one previous ACR, the process 1100 continues by comparing the incremental consumed amount to a volume limit threshold representing a predetermined incremental volume limit between consecutive CCRs for the communication session. In this embodiment, for each at least one previous ACR, the process 1100 also includes determining the incremental consumed amount does not exceed the volume limit threshold.

In a further embodiment of non-transitory computer-readable medium, the first program instructions, when executed by the first computer, cause the corresponding computer-controlled CCF subsystem to perform a further embodiment of the process 1100 in which the CCF subsystem, after receiving the current ACR, adds the usage from the incremental volume parameter of the current ACR to the incremental consumed amount stored in the volume limit storage device. In this embodiment, the process 1100 also includes comparing the incremental consumed amount to the volume limit threshold. In the embodiment being described, the process 1100 continues by determining the incremental consumed amount exceeds the volume limit threshold. In this embodiment, the process 1100 also includes using the incremental consumed amount to form the incremental usage parameter for the current CCR. In yet a further embodiment, the process 1100 continues by clearing the incremental consumed amount stored in the volume limit storage device.

Figure 12:
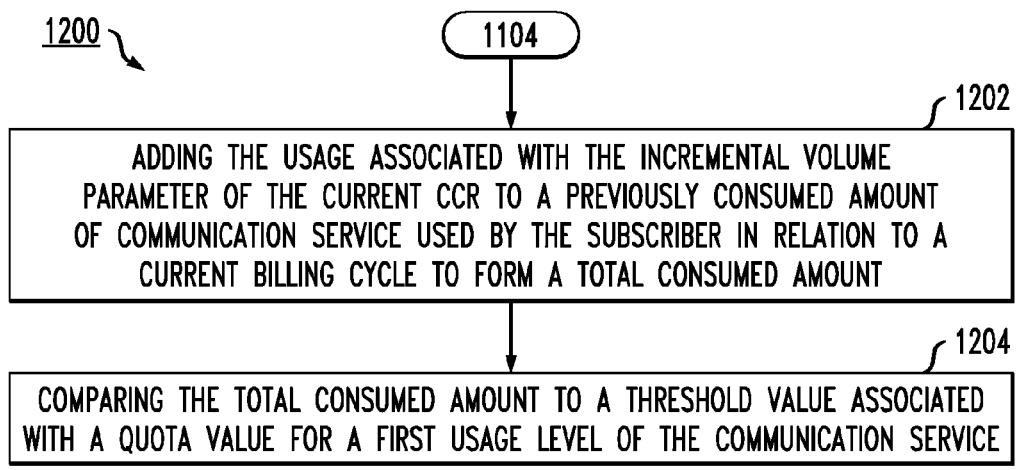
FIG. 12, in combination with FIG. 11, is a flow chart of another exemplary embodiment of a process for providing charging status information to a subscriber of a communication service performed by a computer-controlled charging system executing program instructions stored on a non-transitory computer-readable medium.

With reference to FIGS. 11 and 12, another exemplary embodiment of a non-transitory computer-readable medium storing second program instructions that, when executed by a second computer, cause a corresponding computer-controlled QMF subsystem in a charging system to perform a process 1200 for providing charging status information to a subscriber of a communication service. In one exemplary embodiment, the process 1200 includes the process 1100 of FIG. 11 and continues from 1104 to 1202 where the OMF subsystem adds the usage associated with the incremental volume parameter of the current CCR to a previously consumed amount of communication service used by the subscriber in relation to a current billing cycle to form a total consumed amount. At 1204, the total consumed amount is compared to a threshold value associated with a quota value for a first usage level of the communication service.

Figure 13:
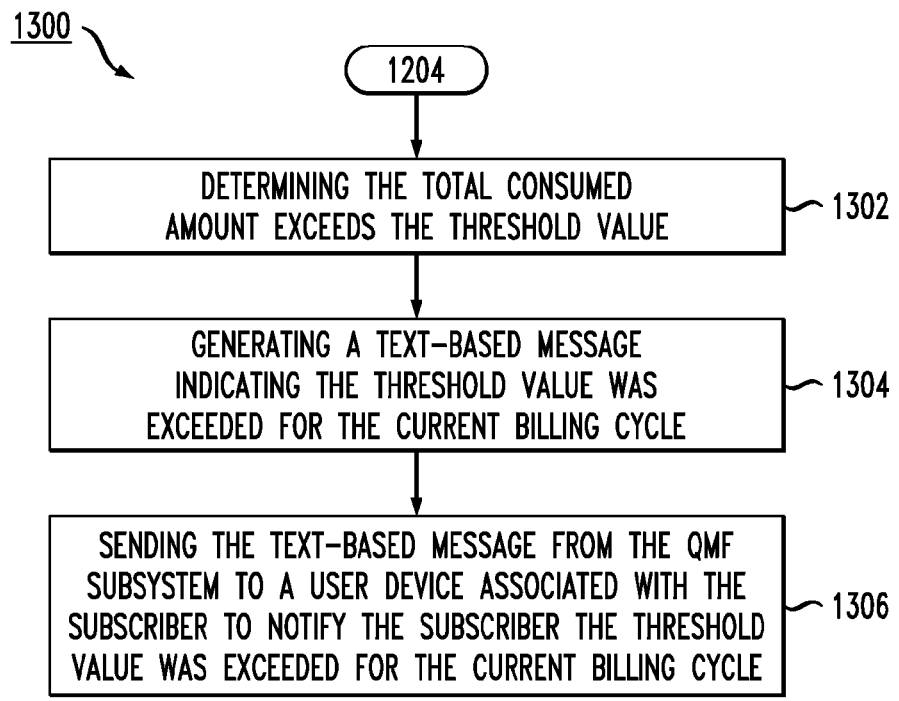
FIG. 13, in combination with FIGS. 11 and 12, is a flow chart of yet another exemplary embodiment of a process for providing charging status information to a subscriber of a communication service performed by a computer-controlled charging system executing program instructions stored on a non-transitory computer-readable medium.

With reference to FIGS. 11-13, yet another exemplary embodiment of a non-transitory computer-readable medium storing second program instructions that, when executed by the second computer, cause the corresponding computer-controlled QMF subsystem in a charging system to perform a process 1300 for providing charging status information to a subscriber of a communication service. In one exemplary embodiment, the process 1300 includes the processes 1100, 1200 of FIGS. 11 and 12 and continues from 1204 to 1302 where the QMF subsystem determines the total consumed amount exceeds the threshold value. Next, a status message indicating the threshold value was exceeded for the current billing cycle is generated (1304). At 1306, the status message from the QMF subsystem is sent to a user device associated with the subscriber to notify the subscriber the threshold value was exceeded for the current billing cycle. The status message may be sent via any suitable communication service using either bearer or control communication channels. The status message, for example, may include a text-based message, an audio-based message, a visual-based message, a multimedia message, or any other suitable type of communication message.

In another embodiment, the process 1300 also includes repeating the processes 1100, 1200 of FIGS. 11 and 12 for another threshold value associated with the quota value for the first usage level until the total consumed amount exceeds the another threshold value or until a last iteration of the processes 1100, 1200 of FIGS. 11 and 12 in which a stop ACR is received and converted to a CCR termination request, the another threshold value higher than a previous threshold value.

In yet another embodiment, the process 1300 also includes determining the total consumed amount exceeds the first usage level. In this embodiment, the process 1300 continues by repeating the processes 1100, 1200 of FIGS. 11 and 12 for another threshold value associated with another quota value for a second usage level until the total consumed amount exceeds the another threshold value or until a last iteration of the processes 1100, 1200 of FIGS. 11 and 12 in which a stop ACR is received and converted to a CCR termination request. In the embodiment being described, the second usage level is higher than the first usage level, the another quota value is higher than a previous quota value, and the another threshold value represents a total consumed amount that is higher than the total consumed amount represented by a previous threshold value.

Figure 14:
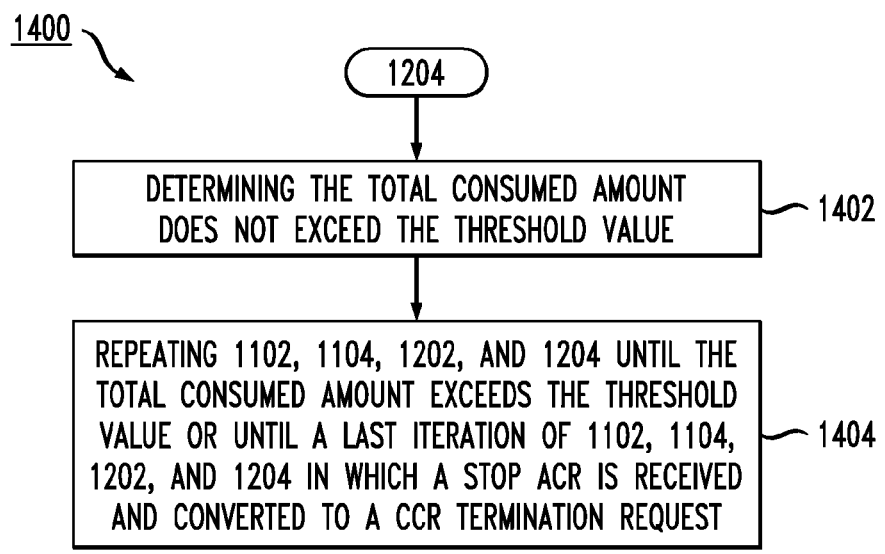
FIG. 14, in combination with FIGS. 11 and 12, is a flow chart of still another exemplary embodiment of a process for providing charging status information to a subscriber of a communication service performed by a computer-controlled charging system executing program instructions stored on a non-transitory computer-readable medium.

With reference to FIGS. 11, 12, and 14, yet another exemplary embodiment of a non-transitory computer-readable medium storing second program instructions that, when executed by the second computer, cause the corresponding computer-controlled QMF subsystem in a charging system to perform a process 1400 for providing charging status information to a subscriber of a communication service. In one exemplary embodiment, the process 1400 includes the processes 1100, 1200 of FIGS. 11 and 12 and continues from 1204 to 1402 where the QMF subsystem determines the total consumed amount does not exceed the threshold value. At 1404, 1102, 1104, 1202, and 1204 are repeated until the total consumed amount exceeds the threshold value or until a last iteration of 1102, 1104, 1202, and 1204 in which a stop ACR is received and converted to a CCR termination request.

In various additional embodiments, the first or second program instructions stored in the non-transitory computer-readable memory, when executed by the first or second computer, may cause the computer-controlled CCF or QMF subsystems to perform various combinations of functions associated with the processes 300, 400, 500, 600, 700, 800, 900 for providing status information to a subscriber of a communication service with reference to FIGS. 3-9. In other words, the various embodiments of the processes described above may be implemented by the first or second program instructions stored in the non-transitory computer-readable medium.

Likewise, in various embodiments, the first or second program instructions stored in the non-transitory computer-readable medium, when executed by the first or second computer, may cause the computer-controlled CCF or QMF subsystems to perform various combinations of functions associated with the various embodiments of the charging system 1000 described above with reference to FIG. 10. Any suitable module described above with reference to FIG. 10 may include the corresponding computer and non-transitory computer-readable medium associated with the corresponding program instructions. Alternatively, the corresponding computer and non-transitory computer-readable medium associated with the corresponding program instructions may be individual or combined components that are in operative communication with any suitable combination of the modules described above with reference to FIG. 10.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for providing charging status information to a subscriber of a communication service, comprising:
receiving a current accounting request (ACR) from a network element (NE) of a communication network at a charging collection function (CCF) subsystem of a charging system, the communication network associated with a service provider, the current ACR associated with a post-paid communication service provided to a subscriber by the service provider via the NE in conjunction with a communication session, the subscriber subject to a rate plan with the service provider that applies different billing rates for different usage levels of the post-paid communication service over a periodic billing cycle, the current ACR including an incremental volume parameter indicating consumed usage of the post-paid communication service for the communication session since a previous ACR;
converting the current ACR to a current credit control request (CCR) during a current billing cycle, the current CCR including an incremental usage parameter representing the incremental volume parameter and indicating the consumed usage of the post-paid communication service for the communication session since a previous CCR, wherein the current ACR is compatible with an offline charging interface protocol for charging system communications and the current CCR is compatible with an online charging interface protocol for charging system communications;
sending the current CCR from the CCF subsystem to a quota monitoring function (QMF) subsystem of the charging system;
adding the consumed usage associated with the incremental volume parameter of the current CCR to a previously consumed amount of the post-paid communication service used by the subscriber during the current billing cycle to form a total consumed amount; and
comparing the total consumed amount to a first threshold value associated with a first quota value for a first usage level of the post-paid communication service during the current billing cycle.

2. The method of claim 1, further comprising:
determining the total consumed amount exceeds the first threshold value;
generating a status message indicating the first threshold value was exceeded during the current billing cycle; and sending the status message from the QMF subsystem to a user device associated with the subscriber to notify the subscriber the first threshold value was exceeded during the current billing cycle.

3. The method of claim 2, further comprising:
repeating the elements of claim 1 for another threshold value associated with the quota value for the first usage level until the total consumed amount exceeds the another threshold value or until a last iteration of the elements of claim 1 in which a stop ACR is received and converted to a CCR termination request, the another threshold value higher than previous threshold values.

4. The method of claim 2, further comprising:
determining the total consumed amount exceeds the first usage level; and
repeating the elements of claim 1 for another threshold value associated with another quota value for a second usage level until the total consumed amount exceeds the another threshold value or until a last iteration of the elements of claim 1 in which a stop ACR is received and converted to a CCR termination request, the second usage level higher than the first usage level, the another quota value higher than previous quota values, and the another threshold value representing a total consumed amount higher than the total consumed amount represented by previous threshold values.

5. The method of claim 1, further comprising:
determining the total consumed amount does not exceed the first threshold value; and
repeating the elements of claim 1 until the total consumed amount exceeds the first threshold value or until a last iteration of the elements of claim 1 in which a stop ACR is received and converted to a CCR termination request.

6. The method of claim 1, further comprising:
receiving at least one previous ACR from the communication network at the CCF subsystem associated with the post-paid communication service provided to the subscriber by the service provider in conjunction with the communication session, the at least one previous ACR including the incremental volume parameter indicating consumed usage of the post-paid communication service for the communication session since a most recent previous ACR;
for each at least one previous ACR, determining the corresponding at least one previous ACR does not include a volume limit parameter indicating a predetermined incremental volume limit was exceeded in conjunction with the communication session since the most recent previous ACR; and
for each at least one previous ACR, adding the consumed usage from the incremental volume parameter of the corresponding at least one previous ACR to an incremental consumed amount stored in a volume limit storage device accessible to the CCF subsystem.

7. The method of claim 6, further comprising:
determining the current ACR includes the volume limit parameter and indicates the predetermined incremental volume limit was exceeded in conjunction with the communication session since the most recent previous ACR; and
adding the consumed usage from the incremental volume parameter of the current ACR to the incremental consumed amount stored in the volume limit storage device to form the incremental usage parameter for the current CCR.

8. The method of claim 1, further comprising:
receiving at least one previous ACR from the communication network at the CCF subsystem associated with the post-paid communication service provided to the subscriber by the service provider in conjunction with the communication session, the at least one previous ACR including the incremental volume parameter indicating consumed usage of the post-paid communication service for the communication session since a most recent previous ACR;
for each at least one previous ACR, adding the consumed usage from the incremental volume parameter of the corresponding at least one previous ACR to an incremental consumed amount stored in a volume limit storage device accessible to the CCF subsystem;
for each at least one previous ACR, comparing the incremental consumed amount to a volume limit threshold representing a predetermined incremental volume limit between consecutive CCRs for the communication session; and
for each at least one previous ACR, determining the incremental consumed amount does not exceed the volume limit threshold.

9. The method of claim 8, further comprising:
after receiving the current ACR at the CCF subsystem, adding the consumed usage from the incremental volume parameter of the current ACR to the incremental consumed amount stored in the volume limit storage device;
comparing the incremental consumed amount to the volume limit threshold;
determining the incremental consumed amount exceeds the volume limit threshold; and
using the incremental consumed amount to form the incremental usage parameter for the current CCR.

10. The method of claim 1 wherein the offline charging interface protocol comprises an Rf interface protocol associated with a Diameter base protocol.

11. The method of claim 1 wherein the online charging interface protocol comprises an Ro interface protocol associated with a Diameter base protocol.

12. An apparatus for providing charging status information to a subscriber of a communication service, comprising:
a charging collection function (CCF) subsystem configured to receive a current accounting request (ACR) from a network element (NE) of a communication network, the communication network associated with a service provider, the current ACR associated with a post-paid communication service provided to a subscriber by the service provider via the NE in conjunction with a communication session, the subscriber subject to a rate plan with the service provider that applies different billing rates for different usage levels of the post-paid communication service over a periodic billing cycle, the current ACR including an incremental volume parameter indicating consumed usage of the post-paid communication service for the communication session since a previous ACR, wherein the CCF subsystem is configured to convert the current ACR to a current credit control request (CCR) during a current billing cycle, the current CCR including an incremental usage parameter representing the incremental volume parameter and indicating the consumed usage of the post-paid communication service for the communication session since a previous CCR, wherein the current ACR is compatible with an offline charging interface protocol for charging system communications and the current CCR is compatible with an online charging interface protocol for charging system communications; and a quota monitoring function (QMF) subsystem in operative communication with the CCF subsystem, wherein the CCF subsystem is configured to send the current CCR to the QMF subsystem, wherein the QMF subsystem is configured to add the consumed usage associated with the incremental volume parameter of the current CCR to a previously consumed amount of the post-paid communication service used by the subscriber during the current billing cycle to form a total consumed amount, wherein the QMF subsystem is configured to compare the total consumed amount to a threshold value associated with a quota value for a first usage level of the post-paid communication service during the current billing cycle.

13. The apparatus of claim 12 wherein the CCF subsystem is configured to receive at least one previous ACR from the communication network, the at least one previous ACR associated with the post-paid communication service provided to the subscriber by the service provider in conjunction with the communication session, the at least one previous ACR including the incremental volume parameter indicating consumed usage of the post-paid communication service for the communication session since a most recent previous ACR;

wherein, for each at least one previous ACR, the CCF subsystem is configured to determine the corresponding at least one previous ACR does not include a volume limit parameter indicating a predetermined incremental volume limit was exceeded in conjunction with the communication session since the most recent previous ACR and configured to add the consumed usage from the incremental volume parameter of the corresponding at least one previous ACR to an incremental consumed amount stored in a volume limit storage device accessible to the CCF subsystem.

14. The apparatus of claim 12 wherein the CCF subsystem is configured to receive at least one previous ACR from the communication network, the at least one previous ACR associated with the post-paid communication service provided to the subscriber by the service provider in conjunction with the communication session, the at least one previous ACR including the incremental volume parameter indicating consumed usage of the post-paid communication service for the communication session since a most recent previous ACR;

wherein, for each at least one previous ACR, the CCF subsystem is configured to add the consumed usage from the incremental volume parameter of the corresponding at least one previous ACR to an incremental consumed amount stored in a volume limit storage device accessible to the CCF subsystem, configured to compare the incremental consumed amount to a volume limit threshold representing a predetermined incremental volume limit between consecutive CCRs for the communication session, and configured to determine the incremental consumed amount does not exceed the volume limit threshold.

15. The apparatus of claim 12, the CCF subsystem comprising:
an instant enhanced CCF (IECCF) server.

16. The apparatus of claim 12, the QMF subsystem comprising:
an instant convergent charging (ICC) suite.

17. The apparatus of claim 12 wherein the previously consumed amount, threshold value, and quota value are stored in a subscriber profile storage device accessible to the QMF subsystem.

18. A non-transitory computer-readable medium storing first program instructions that, when executed by a first computer, cause a corresponding computer-controlled charging collection function (CCF) subsystem in a charging system to perform at least a first portion of a method for providing charging status information to a subscriber of a communication service, the first portion of the method comprising:

converting a current accounting request (ACR) received from a network element (NE) of a communication network at a CCF subsystem of a charging system to a current credit control request (CCR), the communication network associated with a service provider, the current ACR associated with a post-paid communication service provided to a subscriber by the service provider via the NE in conjunction with a communication session, the subscriber subject to a rate plan with the service provider that applies different billing rates for different usage levels of the post-paid communication service over a periodic billing cycle, the current ACR including an incremental volume parameter indicating consumed usage of the post-paid communication service for the communication session since a previous ACR, the current CCR including an incremental usage parameter representing the incremental volume parameter and indicating the consumed usage of the post-paid communication service for the communication session since a previous CCR, wherein the current ACR is converted to the current CCR during a current billing cycle, wherein the current ACR is compatible with an offline charging interface protocol for charging system communications and the current CCR is compatible with an online charging interface protocol for charging system communications; and sending the current CCR from the CCF subsystem to a quota monitoring function (QMF) subsystem of the charging system.

19. The non-transitory computer-readable medium of claim 18 storing second program instructions that, when executed by a second computer, cause a corresponding computer-controlled quota monitoring function (QMF) subsystem in a charging system to perform at least a second portion of the method for providing charging status information to a subscriber of a post-paid communication service, the second portion of the method comprising:

adding the consumed usage associated with the incremental volume parameter of the current CCR to a previously consumed amount of the post-paid communication service used by the subscriber during the current billing cycle to form a total consumed amount; and comparing the total consumed amount to a threshold value associated with a quota value for a first usage level of the post-paid communication service.

20. The method of claim 1 wherein the converting of the current ACR to the current CCR is during the communication session, wherein the comparing of the total consumed amount to the first threshold value is during the communication session.

21. The apparatus of claim 12 wherein the QMF subsystem is configured to determine the total consumed amount exceeds the threshold value, generate a status message indicating the threshold value was exceeded during the current billing cycle, and send the status message to a user device associated with the subscriber to notify the subscriber the threshold value was exceeded during the current billing cycle.

22. The apparatus of claim 12 wherein the CCF subsystems is configured to convert the current ACR to the current CCR during the communication session, wherein the QMF subsystem is configured to compare the total consumed amount to the threshold value during the communication session.

23. The non-transitory computer-readable medium of claim 19, the second portion of the method further comprising:
- determining the total consumed amount exceeds the threshold value;
- generating a status message indicating the threshold value was exceeded during the current billing cycle; and
- sending the status message from the QMF subsystem to a user device associated with the subscriber to notify the subscriber the threshold value was exceeded during the current billing cycle.

24. The non-transitory computer-readable medium of claim 19 wherein the converting of the current ACR to the current CCR is during the communication session, wherein the comparing of the total consumed amount to the threshold value is during the communication session.

\* \* \* \* \*